Jan. 24, 1961     L. A. B. PILKINGTON     2,968,892
MANUFACTURE OF FLAT GLASS IN CONTINUOUS RIBBON FORM
Filed Oct. 16, 1956     2 Sheets-Sheet 1

Inventor
Lionel Alexander Bethune Pilkington
By
Morrison, Kennedy & Campbell
Attorneys Jan. 24, 1961  L. A. B. PILKINGTON  2,968,892
MANUFACTURE OF FLAT GLASS IN CONTINUOUS RIBBON FORM
Filed Oct. 16, 1956  2 Sheets-Sheet 2
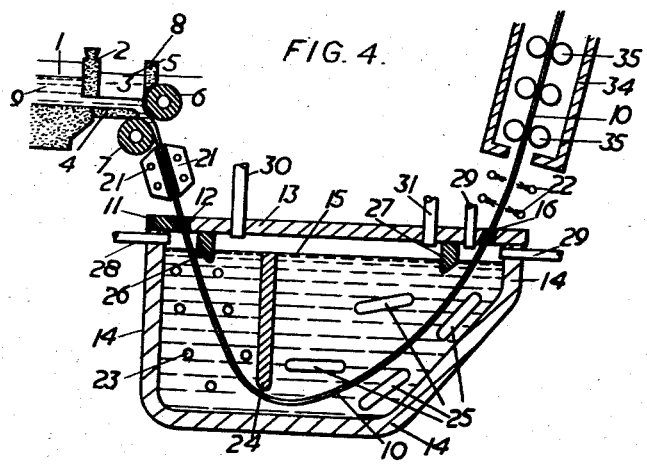
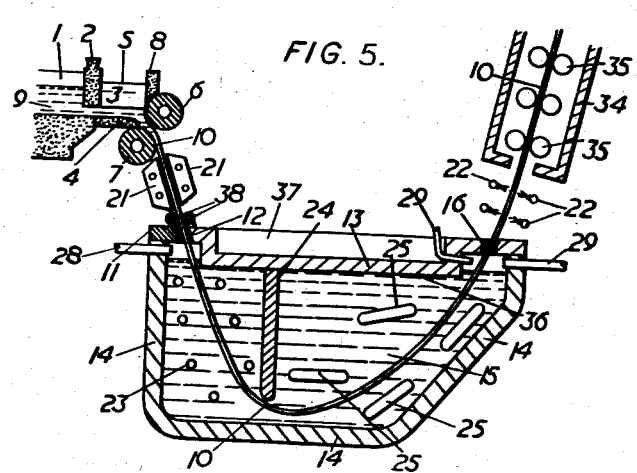
Inventor
Lionel Alexander Bethune Pilkington
By
Morrisan, Kennedy & Campbell
Attorneys United States Patent Office 2,968,892
Patented Jan. 24, 1961

2,968,892
MANUFACTURE OF FLAT GLASS IN CONTINUOUS RIBBON FORM

Lionel Alexander Bethune Pilkington, Rainhill, England, assignor to Pilkington Brothers Limited, Liverpool, England, a corporation of Great Britain Filed Oct. 16, 1956, Ser. No. 616,200

Claims priority, application Great Britain Oct. 18, 1955

4 Claims. (Cl. 49—3)

This invention relates to the manufacture of flat glass, in continuous ribbon form.

In the manufacture of flat glass in continuous ribbon form the usual practice is to flow the molten glass, from which the ribbon is to be formed, from a spout of a tank furnace in which the glass batch is melted, to the pass between casting rolls which are driven at a peripheral speed which is substantially the same as the speed of the ribbon of glass which emerges from the rolls. These rolls are of greater length than the width of the ribbon, and as the molten glass passes between them, they squash it to form a ribbon of the desired thickness. The rolls are mounted to mutual adjustment to regulate the distance between their peripheries, which distance determines the thickness of the ribbon emerging from the rolls. This operation is sometimes referred to as "sizing."

During this operation of sizing the ribbon, the glass passes in intimate contact with the metal of the two rolls and accordingly a heat exchange is effected between the surfaces of the ribbon and the rolls, which may be more severe on the underface of the ribbon, so that the ribbon surfaces are cooled by loss of heat due to heat transfer to the rolls and thus stiffened, and are permanently harmed by their contact with the rolls.

The ribbon is usually supported immediately after formation by a metal apron, or by a series of rollers, which direct the ribbon to a lehr in which the glass is annealed and set and thereby conditioned for presentation in a continuous process, to grinders, and sometimes to polishers which operate on the glass after the grinding stages have been completed. To make the glass transparent, both faces must be ground and polished.

In the process of advancing the ribbon from the sizing rolls, further heat exchanges occur between the underface of the ribbon of glass and the apron or series of rollers, so that before the glass arrives at the rollers which direct the ribbon into apparatus in which it is annealed and set, it is sufficiently cooled to be passed over the rollers in the annealing apparatus.

In the manufacture of blown glass objects such as drinking goblets the surfaces are brilliant because the surfaces set as a result of heat losses achieved solely by radiation, and by heat exchange with a gaseous medium. This result is referred to by glass makers as "fire finish."

In another well known method of producing flat glass in continuous ribbon form the ribbon is formed by vertically drawing the ribbon from a body of molten glass and leading the ribbon over a bending roll by which the ribbon is directed into a horizontal lehr in which the ribbon is annealed and set.

A main object of the present invention is to produce flat glass in ribbon form, the faces of which have a lustre of a quality such as that known as "fire finish," on emerging from the annealing stage, and another main object is to obtain a greater rate of production of transparent flat glass than is at present possible by the usual drawing methods or producing sheet glass or window glass.

Still another important object of the invention is to produce by rolling methods and at least at the usual rolling speeds a transparent flat glass which is the equivalent of that flat glass known as sheet glass or window glass, whereby the finished product is transparent and has a high quality lustre.

A further object of the present invention is to devise an improved method of and apparatus for producing a fire finish on flat glass produced in continuous ribbon form.

The present invention comprises a method of manufacturing transparent flat glass in continuous ribbon form in which the formed ribbon becomes stiffened by cooling before it enters a lehr where it is annealed, characterized in that a fire finish is obtained on both surfaces of the ribbon by immersion in a bath of molten metal by creating in the bath an entry zone for the ribbon, directing the ribbon into the entry zone, maintaining in the entry zone a temperature which is high relatively to that of the entering glass, creating in the bath and outside the entry zone a temperature gradient through which the ribbon leaving the entry zone is passed before it emerges from the bath, the temperature gradient being such that the ribbon leaving the entry zone suffers a loss of heat to reduce conduction of the heat that is in the surfaces of the ribbon from the surfaces to the body of the glass and then is cooled until the glass is stiffened to permit passage from the bath to the lehr, and directing the stiffened glass into the lehr where it is annealed.

The ribbon may be formed on a casting surface for example by flowing the molten glass from which the ribbon is formed on to a casting roll where the glass is converted into a ribbon of predetermined width and thickness, or the ribbon may be produced by a drawing operation from a bath of molten glass.

The method of manufacture may be further characterized in that immediately after the ribbon has left the casting roll on which it is formed, the ribbon is cooled to an extent that sufficient stiffness is attained by the ribbon to enable it to be thrust into the molten bath without losing the said predetermined dimensions of width and thickness.

The present invention also comprises apparatus for manufacturing transparent flat glass in continuous ribbon form in which the formed ribbon becomes stiffened by cooling before it enters a lehr where it is annealed, characterized by the combination with the ribbon forming means on which the ribbon is formed, of a covered tank structure for a bath of molten metal, an inlet to the bath, the latter being disposed in operative relation with the ribbon forming means so that the formed ribbon may be directed through the said inlet to intersect the surface of the bath and be submerged therein, an exit from the bath, means for pulling the ribbon through the bath to and through the exit, the bath having an entry zone where the ribbon enters the bath, defined by a partition across the bath, in which heaters maintain the molten metal at a temperature such that it is hot relatively to the entering glass to effect melting on the surfaces of the ribbon, and thermal regulators in the bath between the said partition and the ribbon exit whereby the surfaces of the ribbon while it is still submerged are progressively stiffened and a fire finish on both surfaces obtained before the ribbon intersects the surface of the bath before emerging from the tank structure, and then directing the stiffened ribbon into the lehr where the flat glass thus produced is annealed.

From another aspect the present invention comprehends apparatus for use in manufacturing transparent flat glass in continuous ribbon form by forming the ribbon on a casting roll, and after the ribbon of glass is stiffened by cooling, advancing the glass through a lehr where it is annealed, characterized by liquid means for producing a fire finish on the surfaces of the ribbon, said liquid means comprising a covered tank structure having an inlet and exit for the ribbon and being so disposed in operative relationship with the casting roll so as to permit the ribbon, as it is formed, to be directed into the bath by intersecting the surface of the bath, and being so disposed in operative relationship with the lehr whereby the traction forces in the lehr, which operate on the ribbon to advance it through the lehr, are available to pull the ribbon through the bath and said ribbon exit, the bath having an entry zone defined by a partition across said bath where the ribbon enters the bath, in which heaters maintain the molten metal at a temperature such that it is hot relatively to the entering glass, to effect melting of the surfaces of the ribbon, and thermal regulators in the bath between the said partition and the ribbon exit whereby the surfaces of the ribbon while it is still submerged are progressively stiffened and a fire finish on both surfaces obtained before the ribbon intersects the surface of the bath before emerging from the tank structure, and then directing the stiffened ribbon into the lehr where the flat glass thus produced is annealed.

In order that the invention may be more clearly understood, preferred embodiments thereof will now be described, by way of example, in which the liquid bath in accordance with the invention is used to thermally treat the submerged ribbon which is drawn through the bath by the traction forces derived from a horizontal lehr.

In the drawings:

Figure 3 is a view similar to Figure 1 showing a modification, hereinafter referred to;

Figure 4 is a view similar to Figures 1 and 2 showing a further modified arrangement in which the bath is associated with a vertical lehr; and Figure 5 is a view similar to Figure 4 showing a furnace structure in which the roof touches the surface of the bath.

In the drawings like references indicate the same or similar parts.

Figure 1:
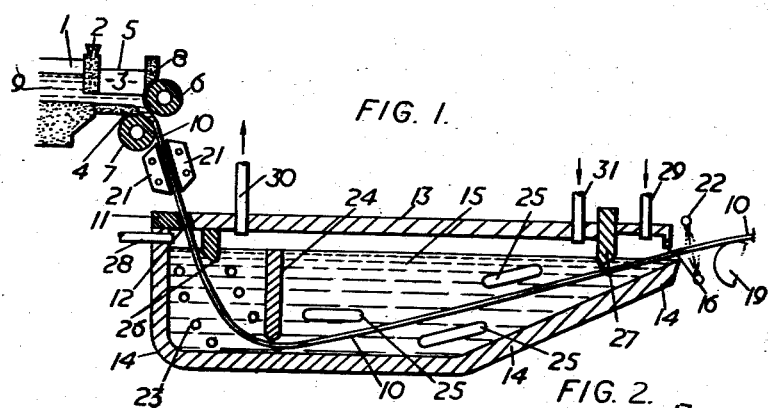
Figure 1 is a diagrammatic sectional elevation showing the ribbon forming means and the path of the ribbon to the exit end of the bath.
Figure 2:
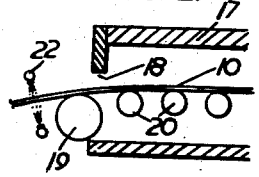
Figure 2 is a continuation of Figure 1 showing the path of the ribbon after it has left the exit end of the bath and has entered a horizontal lehr.

Referring first to the construction shown in Figures 1 and 2, a canal of a continuous glass melting tank is indicated at 1, the regulating tweel at 2 and the spout at 3, the spout comprising a floor or "lip" 4 and side jambs 5, one of which only is illustrated in Figure 1, the side jambs and lip forming a spout of large rectangular cross-section having a width slightly less than that of the ribbon to be produced.

The spout may, in well known manner, be provided with a cover, not shown. Associated with the spout is a pair of water cooled casting rolls, the upper casting roll being indicated at 6 and the lower casting roll at 7. A gate 8 is disposed in contiguity with the casting roll 6 and is adjustably suspended in a vertical plane, in usual manner, by means not shown. The gate 8 shields the top roll 6 from the heat radiated by the molten glass 9 flowing through the canal 1 to and over the spout lip 4 to the pass between the rolls 6 and 7.

Heaters may be incorporated in the side jambs in the usual manner to maintain the jambs at a high temperature in order to minimise the temperature gradient across the spout.

The upper casting roll 6 is disposed in advance of the lower casting roll 7 so that the molten glass 9 flows from the spout lip 4 onto an upper part of the roll 7, this upper part constituting a forwardly and downwardly directed arcuate casting bed moving in the same sense as the free direction of flow from the spout so that the molten glass 9, on leaving the spout and arriving at this casting bed, is constrained to flow forwardly, thus preventing a backward flow of the glass leaving the spout lip 4.

The rolls 6, 7 are adjustable one to the other, in well known manner, in order to effect the sizing of the ribbon produced, which is determined by the width of the pass between the rolls, thus the molten glass 9 which flows to the rolls is formed into a ribbon of predetermined width and thickness; the ribbon is indicated by the reference 10.

Directly beneath the pass of the casting rolls is the inlet 12 of a tank structure 14 containing a liquid bath 15 of molten metal and including a roof 13. A movable tile 11 regulates the width of the inlet 12. The tank structure 14 also includes an exit 16 from the bath 15.

The tank structure is arranged below the level of the casting rolls, and because of the disposition of the inlet 12 of the bath in relation to the pass between the casting rolls 6, 7, the ribbon 10 naturally moves to the inlet 12 under its own weight and intersects the surface of the bath in a direction which is nearly perpendicular to its surface, and it will be observed that the ribbon again intersects the surface of the bath as it is directed out of the bath towards the exit 16 of the tank structure 14.

At 17 is shown a horizontal lehr and at the entry end 18 a polished roll 19 is provided as well as the usual driven conveyor rolls 20, thus the tractive forces applied to the ribbon 10 by the roll 19 and the rolls 20 assist in moving the ribbon through the bath by pulling the ribbon, the speed of the rolls casting 6, 7 and the speed of the rolls such as in the lehr 19, 20 being adjusted as may be necessary to predetermine the length of the ribbon wholly submerged within the bath at any one time and to maintain a constant pull on the ribbon.

The weight of the length of ribbon existing between the casting rolls and the bath naturally tends, by gravitational forces, to thrust the ribbon into the bath. This thrusting force may be assisted by the drive derived from the casting rolls 6 and 7 if the ribbon is cooled sufficiently after leaving the roll to give sufficient stiffness to the ribbon to transmit the propulsive forces whilst retaining sufficient pliability to allow the cooled ribbon to be bent in the bath.

The cooling of the ribbon is preferably obtained by radiation and to this end the ribbon passes between two water boxes which are near to, but in spaced relation with the ribbon, as indicated at 21, thereby the ribbon is sufficiently cooled to have the desired stiffness while retaining sufficient pliability. The water boxes will be secured by brackets (not shown) to the casting machine which comprises the rolls 6, 7 and the means illustrated for supplying the molten glass to the rolls.

In order to avoid the possibility of the ribbon which has passed through the bath being harmed as a result of moving over the roll 19 and the rolls 20 of the lehr, both surfaces of the ribbon may be subjected to a heat exchange with a gaseous medium, which heat exchange can be effected by cooling jets arranged at each surface of the ribbon and indicated at 22. Generally speaking, however, as the ribbon when it leaves the bath will be in a sufficiently stiffened condition, as hereinafter more fully explained, the jets may be unnecessary but are preferably included as a safeguard for the purpose indicated. Such cooling jets may be employed instead of the water boxes 21 on the outer face of the entering bight of the ribbon.

In the construction shown in Figures 1 and 2 the bath 15 through which the ribbon is drawn may be a liquid bath of molten metal having a specific gravity which is substantially greater than that of the glass, e.g. a bath of molten tin.

A suitable bath of molten metal of which the specific gravity is near to that of the glass, is one formed from an alloy of aluminium and tin in which the aluminium predominates, and the bath may be constituted by 80% aluminium and 20% tin, the melting point of such bath being about 658° C. and the boiling point somewhat above 1800° C.

At the entry end of the bath, heaters 23 are arranged in order to maintain the entry zone at the desired temperature through which the entering glass passes before its direction is changed to the path in which it is directed in order to reach the exit 16 of the bath, and the entry zone may be physically defined in the bath by including in the tank structure a partition 24 which is supported in the opposite walls of the tank structure which are at right angles to the partition, and the ribbon in passing through the bath passes under the partition 24. The heat imparted to the entry zone by the heaters 23 is such as to ensure a superficial melting of both surfaces of the ribbon as it passes through the zone.

Between the entry zone and the exit end of the bath, the temperature of the bath is regulated so that a temperature gradient is achieved in order that during the passage of the ribbon to the exit end it suffers sufficient loss of heat to stiffen before the ribbon leaves the bath. The gradient is so regulated that a cooling of the surfaces of the ribbon quickly occurs as the ribbon emerges from the entry zone, thus conduction of heat from the surfaces of the ribbon to the body of the ribbon is reduced and stability of the ribbon assured.

To this end coolers indicated at 25 are arranged in the bath just outside the entry zone and between the entry zone and the exit end to progressively cool the ribbon uniformly so that both surfaces are stiffened before the ribbon emerges from the bath in a condition such that it is incapable of plastic impression deformation by contact with the rollers. However, as previously indicated, as a safeguard air cooling jets 22 may be provided to further cool the ribbon before it passes on to the roll 19 at the entry end of the lehr.

The temperature of the bath in the entry zone is required to be about 1200° C. or somewhat higher in order to effect the flash heating which is required to effect melting of the surfaces of the ribbon in the time during which the ribbon is passing through the entry zone.

The roof 13 of the tank structure is supported by the wall of the structure and is provided with bars 26, 27 near the inlet and outlet openings which not only reinforce the roof but form a liquid seal at each end of the bath by dipping into the bath, so that only the relatively small surface of the bath which is intersected by the ribbon on entering and leaving the bath is in communication with the atmosphere and the headspace above the end surfaces may be charged by pipes 28, 29, 29 with a gas which does not react chemically with the metal of the bath. The gas admitted is conveniently ordinary mains gas which is a reducing gas.

It is to be observed that in the construction described the roof 13 is near to the surface of the bath, indeed the inner face may lie in contiguity with the surface of the bath, and the provision of the bars 26, 27 assures that any dross or any oxide rising to the bath surface is collected on the surface and is segregated from the ribbon, and in case the arrangement permits, and if it is desired to charge to, or circulate in, the space between the roof and the bath, a gas to prevent oxidation of the metal at the surface, i.e. between the liquid seals, inlet and outlet pipes for the gas, indicated at 30 and 31 respectively are provided in the roof.

Figure 3:
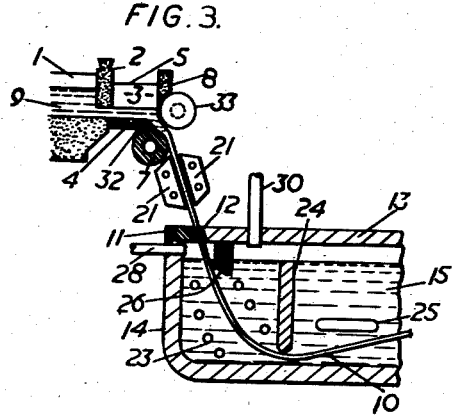

As shown in Figure 3, the ribbon may be produced on the casting roll 7 by flowing the molten glass over a spout lip 4 having a convex surface 32 so that the glass spreads to the desired dimensions of width and thickness on the lip, the marginal areas of the ribbon only being engaged by driven edge rolls 33, the rims of which are preferably patterned, e.g. by milling to not only chill the edges of the ribbon and thereby maintain the intended width and dimension for the ribbon, but also to bite into the margins of the ribbon and help drive it forward. Thus a considerable propelling force is derived from the edge rolls 33 for the ribbon which can be utilised in directing the ribbon into the bath.

The arrangement shown in Figure 4 is similar to that shown in Figures 1 and 2, except that the ribbon, after leaving the tank structure, is taken up a vertical lehr 34 in which it is annealed, this lehr including, in usual manner, pairs of driving rolls 35 through which pair (only the lowermost of which is shown) the ribbon 10 passes.

In all constructions according to the invention the underface of the roof 13, instead of being near to the molten bath 15 as already described, may be so constructed as to dip into it, and in the arrangement illustrated in Figure 5 the roof is so constructed that the underface thereof enters the molten bath 15. The underface 36 may be produced by forming a shallow well 37 in the roof. In such construction gas inlet and outlet pipes 30, 31 such as in the Figure 4 construction, are omitted.

Further in all the constructions illustrated the water boxes on the underside of the entering bight of the ribbon may be replaced by water cooled supporting rollers. Moreover in each construction there may be a pair of water cooled rollers 38 at the inlet 12 as indicated in Figure 5 and such rollers may be carried on the roof structure. The water cooled rollers 38 function to positively guide the ribbon through the inlet 12 to the bath, and may be driven rollers to supplement the gravitational forces in thrusting the ribbon into the bath, the speed of the rollers 40 being synchronised with that of the casting roll 7.

In the appended claims, reference is made to the preforming of a ribbon of glass to definite dimensions of width and thickness, and cooling of the ribbon to an extent sufficient to make it stiff enough to stabilize its dimensions, before the glass reaches the bath of molten metal. Such stable condition of the glass in ribbon form is produced, for example, when molten glass is flowed onto a cooled metal roll to cast the ribbon on the roll or when the molten glass is flowed in conventional manner through the pass between a pair of cooled sizing rolls, the cooling of the glass in its ribbon form being effected in both cases by heat exchange with the casting roll or the sizing rolls as the case may be.

The present invention is to be distinguished from prior art disclosures according to which a glass ribbon is formed by flowing the molten glass directly upon the surface of a molten metal bath and gradually cooling the glass by contact with the molten metal as the glass is advanced along the surface thereof. Such prior art processes do not possess the advantages which characterize the present invention and which have been fully set forth in the preceding detailed description.

I claim:

1. In an apparatus for manufacturing transparent flat glass in continuous ribbon form, the combination with means for preforming a ribbon of glass to definite dimensions of width and thickness, and means for cooling the ribbon to an extent sufficient to make it stiff enough to stabilize its dimensions while it retains sufficient plasticity to allow the ribbon to be bent, of a covered tank structure containing a bath of molten metal and having an inlet to and an exit from the bath, said inlet being disposed in operative relation with the ribbon preforming means and the ribbon cooling means so that the preformed stiffened ribbon may be directed through said inlet to intersect the surface of the bath and be submerged therein until it leaves the bath, means for pulling the ribbon in its bent condition through the bath up and through said exit, the bath having an entry zone for the preformed stiffened ribbon defined by a partition across the tank structure and terminating above the bottom of the tank to permit the bent ribbon to pass thereunder, heaters disposed in said entry zone to maintain the molten metal at a temperature such that it is hot relatively to the entering preformed stiffened ribbon to effect melting of both surfaces of the ribbon as the latter in its submerged condition passes through said entry zone, and thermal regulators in the bath between said partition and said ribbon exit whereby the melted surfaces of the ribbon while it is still submerged are progressively stiffened and a fire finish on both surfaces obtained before the ribbon intersects the surface of the bath in emerging therefrom.

2. In an apparatus for use in manufacturing transparent flat glass in continuous ribbon form, the combination with means for preforming a ribbon of glass to definite dimensions of width and thickness, means for cooling the ribbon to an extent sufficient to make it stiff enough to stabilize its dimensions while it retains sufficient plasticity to allow the ribbon to be bent, a lehr wherein said ribbon is annealed, and means for advancing the ribbon through the lehr of liquid means for producing a fire finish on the surfaces of the ribbon, said liquid means comprising a covered tank structure containing a bath of molten metal, said structure having an inlet to and an exit from the bath for the ribbon and being disposed in operative relationship with the ribbon preforming and the ribbon cooling means so as to permit the ribbon, as it is preformed and cooled, to be directed downwardly into the bath and be submerged therein until it leaves the bath and being disposed in operative relationship with the lehr whereby said means for advancing the ribbon through the lehr, are available to pull the ribbon in its bent condition through the bath and upwardly out of the same and thence through said ribbon exit, the bath having an entry zone defined by a partition across the tank structure where the preformed stiffened ribbon enters the bath and terminating above the bottom of the tank to permit the bent ribbon to pass thereunder, heaters disposed in said entry zone to maintain the molten metal at a temperature such that it is hot relatively to the entering preformed stiffened ribbon to effect melting of both surfaces of the ribbon as it passes in its submerged condition through said entry zone, and thermal regulators in the bath between said partition and said ribbon exit whereby the melted surfaces of the ribbon while it is still submerged are progressively stiffened and a fire finish on both surfaces obtained before the ribbon intersects the surface of the bath in emerging therefrom.

3. A method of manufacturing transparent flat glass in continuous form, which comprises the steps of preforming a ribbon of glass to definite dimensions of width and thickness, cooling the ribbon to an extent sufficient to make it stiff enough to stabilize its dimensions while it retains sufficient pliability to be bent, thereafter continuously directing the preformed stiffened ribbon downwardly into and through an entry zone of a bath of molten metal and then redirecting it upwardly through and out of an exit zone of said bath, maintaining the ribbon completely immersed in the bath from the time it enters the bath until it leaves the bath, maintaining in the entry zone of the bath a temperature which is high relatively to that of the entering preformed stiffened ribbon so as thereby to melt both surfaces of the ribbon as it passes in its immersed condition through said entry zone, maintaining in the exit zone of the bath a temperature gradient such that the ribbon while passing through the exit zone is cooled until the ribbon is stiffened before it leaves the bath to permit passage from the bath to a lehr, and then directing the stiffened ribbon into the lehr where it is annealed.

4. A method of manufacturing transparent flat glass in continuous ribbon form according to claim 3, wherein the bath of molten metal has a specific gravity which is not substantially greater than that of the glass.

References Cited in the file of this patent

UNITED STATES PATENTS

| 710,357 | Heal | Sept. 30, 1902 |
| 789,911 | Hitchcock | May 16, 1905 |
| 2,478,090 | Devol | Aug. 2, 1949 |
| 2,525,203 | Bostroem | Oct. 10, 1950 |
| 2,556,349 | Trautman | June 12, 1951 |
| 2,911,759 | Pilkington et al. | Nov. 10, 1959 |

FOREIGN PATENTS

| 1,082,879 | France | June 23, 1954 |
| 1,117,465 | France | Feb. 27, 1956 |
| 769,692 | Great Britain | Mar. 13, 1957 |